March 4, 1958
J. F. McKAY ET AL
2,825,662
COATING FOR RUBBER ARTICLES
Filed Aug. 31, 1955
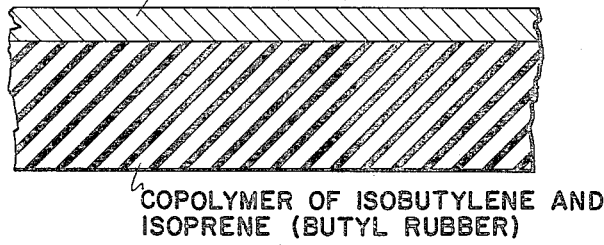
John F. McKay
Donald F. Koenecke
Inventors
Attorney United States Patent Office 2,825,662
Patented Mar. 4, 1958

2,825,662

COATING FOR RUBBER ARTICLES

John F. McKay, Cranford, and Donald F. Koenecke, Westfield, N. J., assignors to Esso Research and Engineering Company, a corporation of Delaware Application August 31, 1955, Serial No. 531,845

5 Claims. (Cl. 117—138.8)

This invention relates to the coating of rubber surfaces and more particularly relates to the coating of the surfaces of rubber articles made from synthetic rubber, such as butyl rubber or GR-S.

For many uses it is desirable to coat objects made of synthetic rubbers with a clear or pigmented protective coating. A clear overcoat gives attractive gloss as well as reduces attack by ozone while pigmented coatings add to the appearance of a rubber object. Examples of coated rubber objects includes rubber-insulated transformer boxes, tire sidewalls, rubber toys, etc. Obviously the coating must have good adhesion to the rubber and good flexibility to be useful.

It is known to prepare synthetic drying oils by the polymerization of diolefin hydrocarbons of 4 to 6 carbon atoms such as butadiene-1,3 with or without comonomers such as styrene or other vinyl aromatic hydrocarbons in the presence of peroxide or alkali metal catalysts or by emulsion polymerization. Such drying oils readily find use as clear varnish coatings or when pigmented as paints and enamels, either baked or air-dried. However, these oils are unsuited for coating synthetic rubber since all attempts to cure these oils on rubber surfaces either by air-drying or baking have failed.

It has now been discovered that synthetic rubber-coated articles can be obtained by first oxidizing the polymer oil to an oxygen content of at least 6.3% and then using this oxidized oil as the basis for the coating. This is a surprising discovery since other oxygenated coatings such as alkyd varnishes or the addition product of the above polymers and maleic anhydride as described in U. S. Patent 2,652,342, issued September 15, 1953, in the name of Anthony H. Gleason, fail to cure satisfactorily on butyl rubber surfaces.

The synthetic oils to which the present invention is applicable are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizale therewith, e. g., with 0 to 40% of styrene, styrenes having alkyl groups substituted on the ring such as para methyl styrene, dimethyl styrene, or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150 and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U. S. Patent 2,586,594 of Arundale et al., filed on October 29, 1947, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial actic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50%-95% non-volatile matter is obtained, the non-volatile matter being a drying oil having a molecular weight below 10,000, preferably between about 2,000 and 5,000.

Again it will be understood that the described sodium polymerization method may be varied considerably as by omitting the styrene co-reactant; or by adding the styrene only after the polymerization of butadiene monomer had begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e. g., butane, benzene, xylene, naphtha, cyclohexane and the like. The diluents are usually used in amounts ranging from 50 to 500 parts per 100 parts of monomer. The reaction temperature may vary between about 40° C. and 100° C., preferably around 65 to 85° C. As a catalyst, 0.1 to 10 parts of dispersed metallic sodium is used per 100 parts of monomers, sodium particle sizes below 100 microns being particularly effective.

In accordance with the present invention the hydrocarbon drying oil can first be dissolved in any aliphatic or aromatic solvent with which it is compatible and then can be blown at temperatures between room temperature and about 280° F. (preferably 200°–260° F.) until the solution attains a moderately heavy body, e. g., T–Z viscosity on the Gardner-Holdt scale. It can then be thinned with additional solvent. The same solvent as that used originally can be employed for thinning, but since the blown oil will tolerate some oxygenated solvent(s) at this stage and will tolerate more and more of this type as the blowing proceeds, such solvents should now be used for thinning, especially when the original solvent was entirely aliphatic. After the oil has been thinned, the blowing can be continued usually with occasional further additions of compatible strong solvent(s) until the resulting oil has been oxygenated sufficiently to become compatible at least with oxygenated solvents alone and preferably until it has become compatible with other film-forming materials and/or varnish-making resins, such as alkyd resins, nitro-cellulose, urea-formaldehyde resins, melamine-formaldehyde resins, triazine resins, rosin, etc. This requires blowing until an oxygen content of at least 6% and preferably 8–9% has been secured. During the blowing some of the solvent is evaporated, and it is usually desirable to condense such solvent and return it to the solution. Apparatus suitable for this purpose is well known to those skilled in the art and needs no extended description here. Some solvent is lost, however, and should be replaced from time to time.

While the procedure described above is satisfactory, it is especially preferred to start the blowing by dissolving the drying oil in strong solvent(s) or in a mixture of strong and weak solvents capable of dissolving the blown oil which is to be produced as the final product. Thus, if blowing is to be terminated when the oxygen content of the blown oil attains 10%, a weaker initial solvent or mixture of solvents can be used than when a final product having 20% oxygen content is to be produced. By selecting the original solvent or solvent mixture on the basis of the final oxygen content, the mass of oil is continuously maintained in the state of a single phase solution.

Another alternative procedure is to start with a mixture of the unblown oil with a solvent or solvent mixture which does not produce an initially homogeneous single-phase condition, but which will dissolve the blown oil completely some time before and at least by the time the desired oxygen content has been reached. Since 5–8% oxygen added to copolymer drying oil will usually produce a blown oil having little compatibility with aliphatic solvents (and hence may lead to gelation in such solvent), it is desirable to use an initial solvent or solvent mixture which will eventually dissolve the blown oil completely before this oxygen content has been reached. Thus the original non-homogeneous mixture of oil and solvent will be converted to a homogeneous single phase solution at least by the time the oxygen uptake attains 5–6%. Further oxygen uptake with additional blowing will then proceed in the desired homogeneous single phase state. The solids content of the starting mass of hydrocarbon oil and solvent, whether a mixture or a single phase solution, can be varied widely. However, for producing a final blown oil suitable for coating purposes it is generally desirable to not only secure the desired oxygen content but also to keep the final viscosity as low as possible. A lower final viscosity in a finished blown oil of desired oxygen content can be secured by starting the blowing with a low non-volatile content of hydrocarbon oil in solvent. Accordingly, for coating work it is preferred to start with low or moderately low non-volatile contents, as around 25–35% N. V. M. After the desired oxygen uptake has been secured by blowing, the solids content of the finished solution can be raised to any desired level by stripping solvent therefrom in conventional manners.

As indicated above, the blowing of the polymeric drying oils is best carried out in a solvent of moderate to good solvency, e. g., solvents or solvent mixtures having a Kauri-Butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low Kauri-Butanol value solvents are generally useful, the oil can be dissolved in strong solvent(s) from the start, thereby eliminating low solvency solvents. The choice of solvents will of course depend on the oxygen content which is desired in the finished oil as well as on the formulations of the coating compositions which are to be made from the blown oil, and in the interest of economy it is generally desirable to use the cheapest solvent(s) which possess the needed attributes of Kauri Butanol value and compatibility with the various ingredients of the finished coating vehicle which is to be formulated.

In the blowing treatment it is desirable to diffuse the air or oxygen as intimately as possible into the oil, and a variety of diffusers and other pieces of equipment are already known and available for this purpose. Combinations of mechanical agitation and blowing are useful, and counter-current pumping of the oil with or without mechanical agitation is beneficial. Catalysts can also be employed. Any of the usual and well-known oxidation or blowing catalysts, or mixtures thereof, are suitable, such as metallic driers (e. g., those composed of or containing lead, iron, cobalt, manganese, zinc), peroxides, or dispersed alkaline salts. As indicated previously, a refluxing column on the blowing chamber is desirable to reduce the loss of solvents from the mass. Some entrainment losses are encountered, however, even then, so that additional solvents may need to be added from time to time if a fairly uniform non-volatile content is to be maintained. High boiling solvents help to minimize such losses.

The blowing can be carried out in either batch or continuous processes, and, as will be understood, can be made a part of the synthesis procedure since the sodium-polymerized synthesized oil is in the form of a solution in solvent at the conclusion of the sodium polymerization. It is known that alkaline salts dispersed in unsaturated materials are helpful to oxidation, so it is obvious that the sodium can be converted to such salts at that point in the synthesis and that the resulting mixture of oil, solvent and salts can be blown advantageously at that stage. The addition of oxygenated solvents during such blowing would of course follow the principles discussed hereinabove.

It will be appreciated that the viscosity of the oil prior to blowing can be varied rather widely depending on the extent of polymerization and cross-linking obtained during its synthesis. Usually it is preferable to keep the original viscosity low so that the bodying which occurs during blowing at elevated temperatures does not produce a finished oil whose viscosity is so high as to limit its utility for coating use. Where, as in some cobodying operations, it is desired to have very high viscosities in the blown oil, then of course it can be advantageous to start with an unblown oil of high viscosity.

It will be understood that the conditions of temperature and time of reaction, the ratio of reactants, degree of dilution, kind(s) of solvents added from time to time, and other processing variations depend on the degree of oxidation desired, the nature of the starting polymer, the inhibiting effects of certain solvents, the viscosity which is sought at the desired oxygen content and also depend on the end use of the blown oil. Accordingly, it will be apparent that one skilled in the art can exercise much discretion guided by experience in practicing the present invention.

In accordance with this invention a blown oil prepared as described above and having an oxygen content of at least 6.3% has been found to form films having excellent adhesion characteristics when applied to surfaces of synthetic rubber such as butyl rubber (the copolymer of a major proportion of isobutylene and a minor proportion of isoprene), GR–S (an emulsion copolymer of butadiene and styrene), neoprene (a poly-chloroprene), etc. If the oxygen content exceeds 10% the film becomes too brittle for many purposes, although for certain purposes the flexibility of the film is of little importance. For these reasons, oxygen contents between 7 and 10% are preferred.

The accompanying drawing is a greatly magnified diagrammatic sectional view showing the present invention as applied to a structure comprising an isobutylene-diolefin polymer (butyl rubber) base covered with an air-blown cured adherent film of an oily copolymer of butadiene and styrene.

The following examples are given to illustrate but not to limit the invention.

*Example I*

A butadiene-styrene copolymer oil was prepared from the following charge:

| | Parts |
|---|---|
| Butadiene-1,3 | 80 |
| Styrene | 20 |
| Varsol[1] | 200 |
| Dioxane | 40 |
| Isopropanol | 0.2 |
| Sodium[2] | 1.5 |

[1] Straight run mineral spirits; API gravity, 49.0; flash, 105° F.; boiling range 150° to 200° C.; solvent power, 33–43 Kauri Butanol value (reference scale: benzene–100 K. B. value, n-heptane 25.4 K. B. value).
[2] Dispersed to a particle size of 10 to 50 microns by means of an Eppenbach Homo-Mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 97% non-volatile matter. The resulting product had a viscosity of 2.4 poises at 50% non-volatile matter in Varsol.

*Example II*

Test pads of butyl rubber were made according to the following typical recipe:

| | Parts |
|---|---|
| Copolymer of 97% isobutylene and 3% isoprene | 100 |
| Zinc oxide | 5 |
| Stearic acid | 1 |
| High calcined clay | 90 |
| Paraquinone dioxime | 1.5 |
| Benzothiazyl disulfide | 4 |
| $Pb_3O_4$ | 5 |
| Cure 16' @ 320° F. | |

The polymer oil of Example I was dissolved in Solvesso 150, a substantially 100% aromatic solvent boiling between 365–415° F., and blown with air as described above until the oxygen content reached 12.6%. The test rubber pads were then spray coated with the blown oil. Curing was by baking 30' @ 300° F. Hard 1.5 mil films were obtained which could not be scraped or scratched off the butyl. The high gloss films were not cracked when the butyl pads were sharply bent.

*Example III*

A butyl test pad was coated with a polymer oil which had been cobodied with about 1% maleic anhydride as described in U. S. Patent 2,652,342. After baking for 30' @ 300° F. followed by 15' @ 350° F. the films were still tacky. The addition of 0.2% lead 0.02% manganese driers to the oil did not improve the cure.

*Example IV*

A Glyptal 2475 (manufactured by General Electric), an alkyd type varnish, was sprayed on a butyl pad and baked 30' @ 300° F. The film was extremely tacky—almost wet—and eyeholed badly indicating no cure. When 0.02% manganese drier was added to the Glyptal vehicle, films on butyl were still tacky after 30' @ 300° F.

*Example V*

Samples of the polymer oil of Example I were blown with air in accordance with the method of Example II to various oxygen contents and used to coat pads of various types of rubber in accordance with the technique of Example II. The results obtained were compared with those obtained with alkyd type resins and with unoxidized polymer oil of Example I. The following data were obtained:

| | Butyl | | Neoprene | | GR–S | | Natural | |
|---|---|---|---|---|---|---|---|---|
| | Tack[1] | Flex[2] | Tack | Flex | Tack | Flex | Tack | Flex |
| Oxidized oil of Example II containing 6.3% $O_2$ | 3 | ⅛ | 2 | ⅛ | 1 | ⅛ | 2 | ⅛ |
| Oxidized oil of Example II containing 7.9% $O_2$ | 1 | ⅛ | 0 | ⅛ | 0 | ⅛ | 0 | ⅛ |
| Oxidized oil of Example II containing 9.5% $O_2$ | 1 | ⅛ | 0 | ⅛ | 1 | ⅛ | 0 | ¼ |
| Oxidized oil of Example II containing 13.7% $O_2$ | 0 | >¾ | 0 | ½ | 0 | >¾ | 0 | ⅝ |
| Oxidized oil of Example II containing 16.0% $O_2$ | 0 | >¾ | 0 | ⅝ | 0 | >¾ | 0 | >¾ |
| Polymer oil of Example I | 7 | ---- | 8 | ---- | 7 | ---- | 8 | ---- |
| Alkyd | 5 | ⅛ | 2 | ⅛ | 7 | ---- | 2 | ⅛ |

[1] A tack of 0 to 2 is considered to represent an excellent cure, while any tack over 3 is considered to indicate failure. A tack of 3 indicates a poorly cured film.
[2] Flexibility tested by rod mandrel and is recorded as the smallest diameter in inches over which the film can be bent without cracking. ⅛ is the best possible rating under these test conditions.

The above data show that films of oxidized oils having at least 6.3% oxygen can be cured on all types of synthetic rubber but the cure on butyl rubber is not as good as on neoprene or GR–S. However, films having oxygen contents of 7.9% give excellent cures on all types, including butyl rubber. For these reasons it is preferred that the oxygen content of the oils used in films on butyl contain at least 7% oxygen. The data further show that as the oxygen content increases beyond 9.5%, the flexibility of the film decreases. Therefore, those films prepared from oxidized polymer oils containing between 7% and 10% oxygen offer the best characteristics with regard to cure and flexibility.

It is also clear from the data that the unoxidized oil will not cure on any type of natural or synthetic rubber, while alkyd type resins will not cure on butyl or GR-S. The oxidized polymer oils thus offer a more versatile coating material since they can be used on any type of synthetic rubber.

The above data show that an oxidized polymer oil is unique in being the only type of oil which will cure on the surface of butyl rubber. A modified oil containing maleic anhydride or a glyptal resin varnish will not cure on the butyl surface, even though both of these oils contain oxygen in the molecule.

The nature of the present invention having been thus fully set forth and specific examples of the same given, what is claimed as new and useful and desired to be secured by Letters Patent is:

1. A structure comprising a rubbery polymer base comprising a major proportion of isobutylene and a minor proportion of isoprene and a cured coating for the surface of said base comprising an adherent film of a polymer oil of a conjugated diolefin from 4 to 6 carbon atoms, said polymer oil having had at least 6.3% oxygen incorporated therein by air blowing.

2. A structure according to claim 1 in which the polymer oil is a polymer of butadiene-1,3.

3. A structure according to claim 1 in which the polymer oil is a copolymer of butadiene and styrene.

4. A structure according to claim 3 in which the polymer oil is prepared by sodium polymerization.

5. A structure according to claim 4 in which the oxidized polymer oil contains 7 to 10% oxygen.

References Cited in the file of this patent

UNITED STATES PATENTS

| | | |
|---|---|---|
| 1,873,935 | Lommel et al. | Aug. 23, 1932 |
| 1,901,045 | Schmidt | Mar. 14, 1933 |
| 2,230,894 | Gumlich | Feb. 4, 1941 |
| 2,544,555 | Jones et al. | Mar. 6, 1951 |
| 2,586,594 | Arundale | Feb. 19, 1952 |
| 2,648,613 | Shinkle | Aug. 11, 1953 |
| 2,652,342 | Gleason | Sept. 15, 1953 |